US006114465A

United States Patent [19]
Vasic

[11] Patent Number: 6,114,465
[45] Date of Patent: Sep. 5, 2000

[54] TEAR PROPAGATION-RESISTANT RUBBER COMPOUND

[75] Inventor: Georg Vasic, Mettmann, Germany

[73] Assignee: Paguag GmbH & Co., Düsseldorf, Germany

[21] Appl. No.: 09/065,415

[22] Filed: Apr. 24, 1998

[51] Int. Cl.[7] .......................... C08F 14/16; C08F 114/16; C08F 8/00; C08L 83/00

[52] U.S. Cl. ..................... 525/330.7; 525/330.7; 525/193; 525/100; 524/456

[58] Field of Search ................. 525/330, 331.8, 525/331.7; 428/212

[56] References Cited

U.S. PATENT DOCUMENTS

| | | | |
|---|---|---|---|
| 3,881,536 | 5/1975 | Doran, Jr. et al. | 152/209 R |
| 4,119,587 | 10/1978 | Jazenski et al. | 524/104 |
| 4,278,587 | 7/1981 | Wolff et al. | 524/262 |
| 4,287,012 | 9/1981 | Midgley et al . | |
| 4,436,847 | 3/1984 | Wagner et al. | 523/203 |
| 4,474,908 | 10/1984 | Wagner . | |
| 4,483,951 | 11/1984 | Brenner | 524/82 |
| 4,764,562 | 8/1988 | Tojo et al. | 525/281 |
| 4,814,390 | 3/1989 | Tojo et al. | 525/331.7 |
| 4,877,817 | 10/1989 | Tojo et al. | 521/142 |
| 5,073,597 | 12/1991 | Puydak et al. | 525/193 |
| 5,883,145 | 3/1999 | Hurley et al. | 521/144 |

FOREIGN PATENT DOCUMENTS 3821463  12/1989  Germany .

*Primary Examiner*—David W. Wu
*Assistant Examiner*—Tanya Zalukaeva
*Attorney, Agent, or Firm*—Browdy and Neimark P.L.L.C.

[57] ABSTRACT

The invention relates to a highly tear propagation-resistant rubber compound, particularly for sealing and expansion bellows, containing an elastomer, fillers and other auxiliaries. In order to achieve high tear-propagation resistance with high imperviousness, dynamic stress resistance and chemical resistance, a rubber compound is proposed which contains polychloroprene as the elastomer and amorphous silica as the filler, and which is obtained by silanising in the presence of the acid acceptor and the silica, prior to adding other additives.

26 Claims, No Drawings

TEAR PROPAGATION-RESISTANT RUBBER COMPOUND

The invention relates to a highly tear propagation-resistant rubber compound which is particularly suitable for the manufacture of sealing or expansion bellows.

In addition to displaying very high tear-propagation resistance (notch resistance), sealing and expansion bellows in particular must be able to withstand very high dynamic stresses. This relates in particular to a high required compressive and tensile strength, as well as extensibility. Different fields of application additionally require high resistance to the effect of chemical media, such as joint grease, hot water, hot air or ozone. Furthermore, sealing and expansion bellows must also resist compressive and tensile deformation at temperatures up to 100° C., and even up to 120° C. for short periods, and they must be low-temperature resistant down to –50° C.

Up to now, these stringent demands have only been completely fulfilled by bellows made of polyurethane, which are characterised by extremely high tear-propagation resistance and are very resistant to tear initiation and penetration. However, it has proven to be a great disadvantage in different fields of application that bellows made of polyurethane material exhibit only very unsatisfactory temperature resistance and imperviousness, this making it necessary to frequently replace the bellows.

Furthermore, rubber compounds based on polychloroprene are known from U.S. Pat. No. 4,474,908 and DE 38 21 463 A1, which contain silica and an acid acceptor, such as magnesium oxide, and other additives like coupling agents of the silane-type. However, these rubber compounds do not completely fulfil the requirements, particularly as regards the notch resistance required for sealing and expansion bellows.

The task of the present invention is to create a rubber compound with a tear-propagation resistance similar to that of polyurethane materials which also exhibits high stability under dynamic stress, sufficient temperature resistance and imperviousness, and also resists compressive and tensile deformation for extended periods at elevated temperatures under the influence of chemical media.

Surprisingly, this task can be solved in that polychloroprene, preferably high-molecular, is used as the elastomer and amorphous silica as the filler, where the rubber compound is obtained by silanising the polychloroprene with the amorphous silica and the acid acceptor using a silanisation agent, prior to adding other additives.

The rubber compounds according to the invention are characterised by high imperviousness and good dynamic properties and, surprisingly, they also reach a tear-propagation resistance equal to that of polyurethane. This is especially surprising considering the fact that the rubber compounds with polychloroprene as the base component used in the past exhibited only moderate tear-propagation resistance (notch resistance). However, extensive tests showed that the notch resistance of the rubber compound can be substantially improved precisely by using amorphous silica as the filler and the special process of silanisation. In this context, it was determined that increasing the notch resistance of the rubber compounds is accompanied by a change in the crack pattern, which indicates a change in the crack propagation mechanism.

Silanisation can take place above 60° C., but temperatures above 70° C. are preferable and the range from 80 to 110° C. is most preferable, although higher temperatures are also possible. The silanisation time can amount to several minutes (e.g. 2 to 5 minutes), for example, the optimum silanisation time being a function of temperature.

Maximum values for tear-propagation resistance were obtained at a degree of vulcanisation between 80 and 95%.

Using silanised amorphous silica as the filler has proven to be particularly advantageous. The tear-propagation resistances obtained with rubber compounds of this kind are equal to, or even higher than, those of polyurethane materials.

The primary particle size of the silica used can range from 5 to 400 nm, preferably ranging from 5 to 40 nm, where a significant fraction can exhibit a particle size below 10 nm.

It was furthermore surprisingly discovered that, when using fumed (pyrogenic) silica as the filler, the rubber compounds manufactured exhibited virtually equal tear-propagation resistances in both the longitudinal and transverse directions of a test specimen. This represents a considerable advantage over the use of precipitated silica as the filler, where the ratio of the tear-propagation resistances in the longitudinal and transverse directions can differ by up to 50%. Using amorphous fumed silica thus results in a rubber compound with which very uniform products can be produced even by very different manufacturing processes (IM, CM, TM, etc.) and even in processes involving milling.

The amorphous silica is preferably used as a filler with at least 5 parts by weight to 100 parts elastomer, where a content of 20 to 40 parts to 100 parts polychloroprene is particularly preferred.

One to 12 percent by weight silane referred to the silica component are preferably used for silanisation, where 7 to 10 percent by weight is particularly advantageous. Bifunctional polysulphidic organosilanes, such as bis-(3-trialkoxysilylpropyl)-tetrasulphide, w-haloalkyltrialkoxysilanes, vinyltrialkoxysilanes, aminoalkyltrialkoxysilanes are preferably used as silanes, in combination or individually, but other silanes, especially of trialkoxysilane-typ, can be used.

Other fillers can also be added to the rubber compound, particularly carbon black and preferably active carbon black, where it is advantageous to add more than 5 parts carbon black to 100 parts polychloroprene.

It has also proven advantageous to use plasticisers in the manufacture of moulded parts made of the rubber compound according to the invention, in order to produce rubber compounds which are highly tear propagation-resistant even in low to medium hardness ranges (less than 55 Shore A), i.e. in a hardness range which is particularly ideal for sealing and expansion bellows. In contrast, materials made of polyurethane only exhibit adequate tear-propagation resistances upwards of 70 Shore A. Aromatic mineral plasticisers and/or one or more ester plasticisers can preferably be used as plasticisers, where 2 to 40 parts—preferably approx. 30 parts—plasticiser (total amount of plasticisers) are added to 100 parts elastomer.

The rubber compound according to the invention can also contain vulcanising agents, where thiourea derivatives, such as ethylene, diethylene, diphenyl or tetramethylene thiourea, are used in particular. 3-methylthiazolidinethione-2 has also proven to be advantageous. The vulcanising agents are added, individually or in combination, in an amount of 0.3 to 3 parts—preferably 1 to 1.3 parts—to 100 parts polychloroprene.

An activator, such as zinc oxide, can be added to the rubber compound, where preferably more than one part—most preferably 3 to 5 parts—activator are added to 100 parts polychloroprene.

Possible accelerators also include sulphur, TMTD, TMTM, MBTS or other common accelerators.

Furthermore, stabilisers or acid acceptors, such as magnesium oxide, can be used at more than one part—preferably 3 to 6 parts—to 100 parts polychloroprene.

Anti-ozonants, such as paraffins or micro-waxes, particularly mixtures of the two which are preferably of high-molecular structure, are advantageously added to the rubber compound, where preferably at least one part—most preferably 3 to 5 parts—anti-ozonant are added to 100 parts polychloroprene.

In addition, more than 0.5 —preferably 2 to 5 —parts antioxidant can be added to the rubber compound, where the antioxidant can consist of one or several compounds from the group of N-isopropyl-N-phenyl-P-phenylenediamine, styrenated, cumylated or octylated diamines.

It has also proven highly advantageous to add an internal lubricant to the rubber compound, preferably more than 0.1 part—most preferably 2 to 10 parts—to 100 parts polychloroprene. This permits the coefficient of friction of the rubber compound to be varied, which enables the manufacture of non-skid materials, as well as materials with high surface slip.

Polyethylene glycol, for example, can be used as a lubricant.

This measure has also proven to be particularly effective and very helpful in preventing the manufactured rubber article from sticking to the mould and in considerably facilitating its removal from the mould. In particular, the use of lubricants effectively prevents plate-out on the corresponding moulds, this usually impairing the processing of the polychloroprene rubber compounds according to the invention. Under certain circumstances, this can substantially improve the processability of the rubber compounds according to the invention. Individual lubricants and processing aids, or combinations thereof, which contain fatty acids or their derivatives, particularly stearic acid or its derivatives, have proven to be particularly suitable. The fatty acids or their derivatives are preferably added at more than 0.5 parts—most preferably 1 to 3 parts—to 100 parts polychloroprene.

Following silanisation and the addition of the other additives, the rubber compound can be processed at higher temperatures than those for silanisation, for example at 100 to 140° C., preferably at 110 to 130° C., although higher temperatures are also possible if necessary.

The field of application of the rubber compound according to the invention is not restricted to the manufacture of sealing and expansion bellows, but rather in general to the manufacture of highly tear-resistant articles subject to high dynamic stress, including bonded articles.

The invention is described below based on a practical example:

An example of the composition of the rubber compound according to the invention is as follows:

| | |
|---|---|
| Polychloroprene | 100 parts |
| Fumed silica | 25 parts |
| Silanisation agent | 2 parts |
| Carbon black | 35 parts |
| Zinc oxide | 3 parts |
| Magnesium oxide | 4 parts |
| Plasticiser | 30 parts |
| Vulcanising agent | 4 parts |
| Other auxiliaries | 5 parts |

The rubber compound is manufactured using standard methods. In this context, the silica was silanised together with the magnesium oxide and the elastomer, before other components of the rubber compound were added.

With the rubber compound described above, notch resistances of 33 N/mm (2 mm sheet) were obtained according to DIN 53505A, which correspond to the 35 N/mm notch resistance of a common polyurethane material and exceed that of conventional polychloroprene compounds of approx. 10 N/mm by a factor of more than 3.

In a test according to DIN 53515 (2 mm sheet), a notch resistance of 74 N/mm was obtained for the rubber compound according to the invention, as compared to 57 N/mm for a common polyurethane material. Thus, a tear-propagation resistance is obtained which is more than 3.5 times higher than that of a conventional polychloroprene material (notch resistance: 20 N/mm).

In the needle test according to EN-1398 (2 mm sheet), values of 35 N/mm were obtained, which exceeded those of the polychloroprene reference material by a factor of 1.75.

Tests of tensile strength according to DIN 53504 show that the rubber compound, with a tensile strength of 22 MPa as compared to 17 MPa for the polychloroprene reference specimen, has also been markedly improved. A considerably higher elongation at break of 670% was determined in a DIN 53504 test, as compared to 460% for the conventional polychloroprene reference material.

The other properties, such as resistance to chemical media, temperature resistance, imperviousness, etc., correspond to the values of conventional rubber compounds based on polychloroprene, which are superior to those of polyurethane materials.

What is claimed is:

1. A rubber compound comprising polychloroprene, amorphous silica as filler, an acid acceptor and other additives, said rubber compound prepared by the process of:
    (a) silanizing polychloroprene with the amorphous silica and the acid acceptor using a silanizing agent prior to adding other additives; and
    (b) subsequently adding other additives.

2. Rubber compound according to claim 1, characterised in that the filler is fumed silica.

3. Rubber compound according to claim 1, wherein it contains more than 5 parts silica to 100 parts elastomer.

4. Rubber compound according to claim 1, wherein the silanisation agent is a bifunctional polysulphidic organosilane w-haloalkyl trialkoxysilane, vinyl trialkoxysilane, aminoalkyl trialkoxysilane, mercaptoalkyl trialkoxysilane or alkyl trialkoxysilane, or a combination thereof.

5. Rubber compound according to claim 4, wherein it contains 1 to 12 parts by weight silanisation agent referred to 100 parts silica.

6. Rubber compound according to claim 1, wherein the rubber compound contains at least 1 part acid acceptor to 100 parts elastomer.

7. Rubber compound according to claim 1, wherein the rubber compound also contains carbon black as a filler.

8. Rubber compound according to claim 7, wherein it contains at least 5 parts carbon black to 100 parts elastomer.

9. Rubber compound according to claim 1, wherein the rubber compound contains a thiourea derivative or 3-methylthiazolidinethione-2 as a vulcanising agent.

10. Rubber compound according to claim 9, wherein the rubber compound contains at least 0.3 parts vulcanising agent to 100 parts elastomer.

11. Rubber compound according to claim 1, wherein the rubber compound contains at least one plasticizer in amounts of 2 to 40 parts—preferably 25 to 30 parts—to 100 parts elastomer.

12. Rubber compound according to claim 1, wherein the rubber compound contains a fatty acid or a fatty acid derivative in amounts of at least 0.5 parts to 100 parts elastomer.

13. Process for the manufacture of a rubber compound with very high tear-propagation resistance, containing polychloroprene, amorphous silica as the filler, an acid acceptor and other additives, characterised in that the polychloroprene is first silanised with the amorphous silica and the acid acceptor using a silanisation agent, before other additives are added.

14. Process for the manufacture of a rubber compound according to claim 13, characterised in that more than 5 parts fumed silica and 1 part acid acceptor are added to 100 parts polychloroprene.

15. An article made from a rubber compound according to claim 1.

16. An article as in claim 15 as a sealing or expansion bellow.

17. An article made from a rubber compound according to claim 6.

18. An article made from a rubber compound according to claim 12.

19. An article as in claim 18 as a sealing or expansion bellow.

20. The rubber compound according to claim 4, wherein the bifunctional polysulphedic organosilane is bis-(3-trialkoxysilylpropyl)-tetrasulphide or a corresponding sulphide.

21. The rubber compound according to claim 3 containing 20–40 parts of said silica.

22. The rubber compound according to claim 5 containing 7–10 parts by weight of said silanization agent.

23. The rubber compound according to claim 10 containing 1–1.3 parts of said vulcanizing agent.

24. The rubber compound according to claim 11 containing 25–30 parts of said at least one plasticizer, and wherein said plasticizer is selected from the group consisting of aromatic mineral plasticizers, ester plasticizers and mixtures thereof.

25. The rubber compound according to claim 12 wherein said fatty acid or fatty acid derivative is stearic acid or a derivative thereof, and is present in an amount of 1–3 parts.

26. The process according to claim 13 wherein said rubber compound is subsequently processed at a temperature of at least 100° C.

* * * * *